Sept. 11, 1934.  C. W. RICE  1,973,673
SOUND OR AIR WAVE APPARATUS
Filed Dec. 10, 1931   2 Sheets-Sheet 1
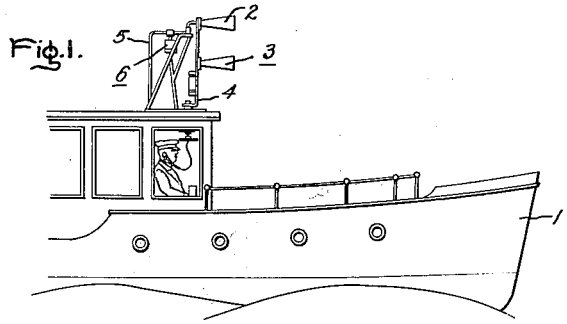
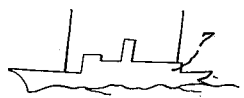
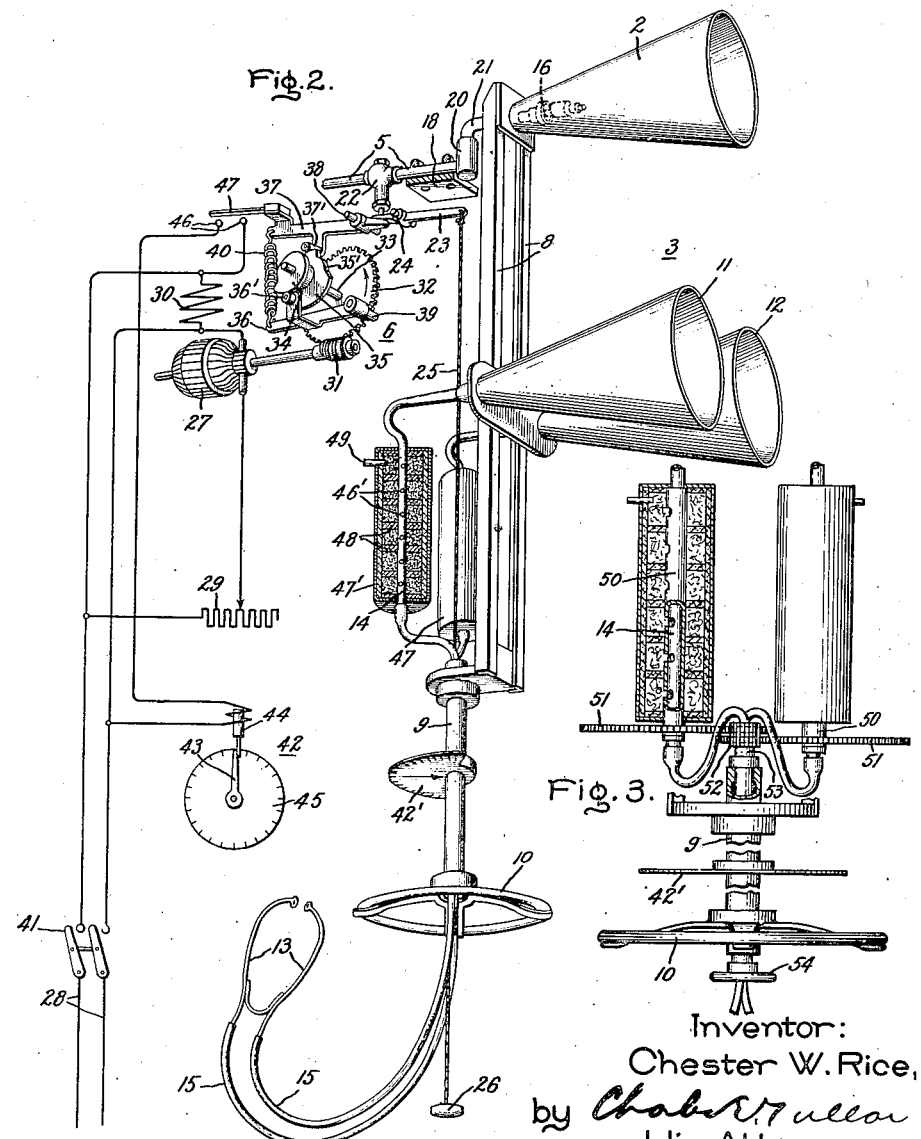
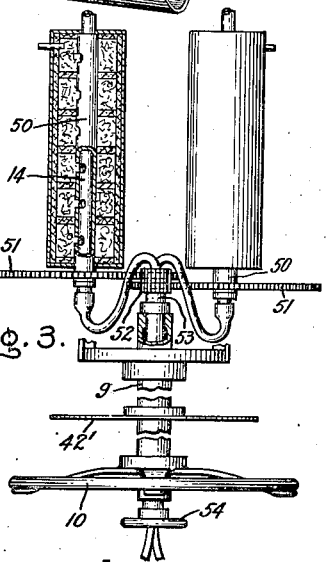
Inventor:
Chester W. Rice,
by *Chas. F. Mullen*
His Attorney.

Sept. 11, 1934.     C. W. RICE     1,973,673
SOUND OR AIR WAVE APPARATUS
Filed Dec. 10, 1931     2 Sheets-Sheet 2
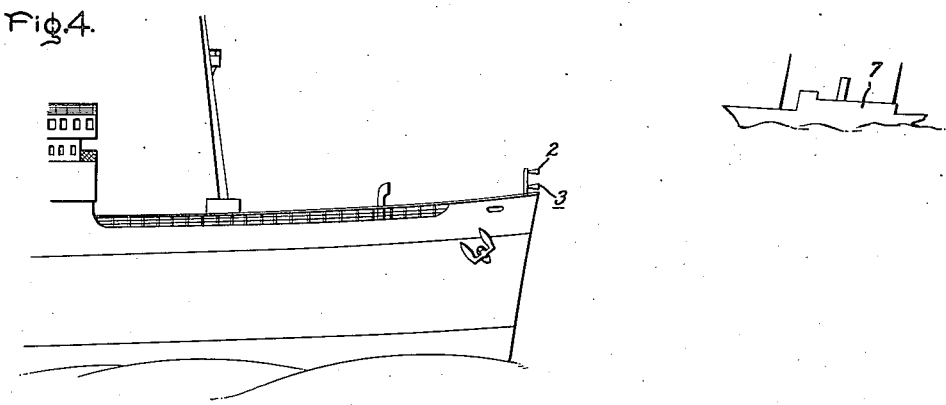
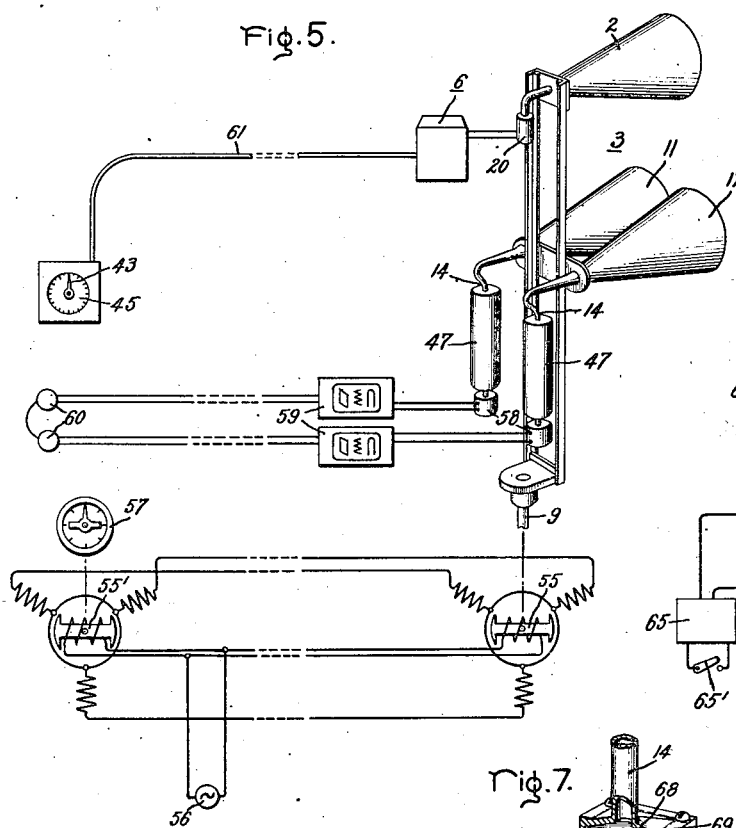
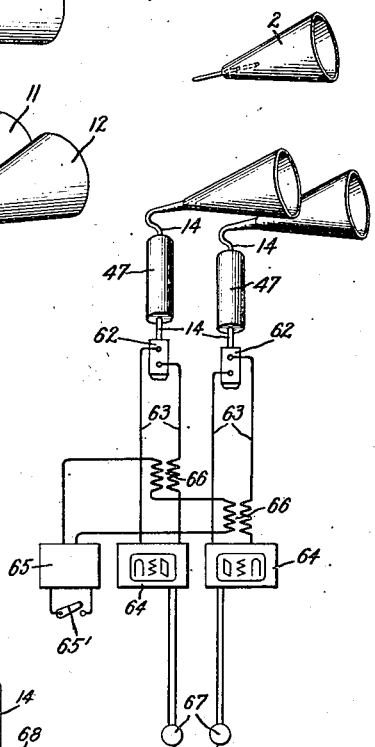
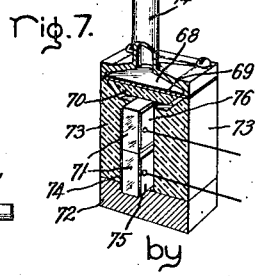
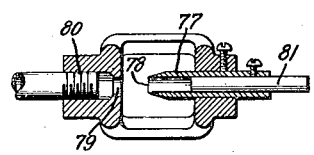
Inventor:
Chester W. Rice,
by
His Attorney.

Patented Sept. 11, 1934

1,973,673

UNITED STATES PATENT OFFICE 1,973,673

SOUND OR AIR WAVE APPARATUS

Chester W. Rice, Schenectady, N. Y., assignor to General Electric Company, a corporation of New York Application December 10, 1931, Serial No. 580,115

11 Claims. (Cl. 181—0.5)

My invention relates to sound or air wave apparatus and more particularly to such apparatus arranged for use on moving craft.

A number of devices have been devised for utilizing air, or sound, waves for determining distance between the source of such waves and a distant reflecting surface, the interval of time between the emission of the air waves and receipt of the emitted waves after reflection from the distant surface being utilized as a measure of the distance between the source and the reflecting surface. An improved device of this type utilized for indicating the altitude of aircraft above the earth is disclosed in my copending application, Serial No. 461,620, filed June 16, 1930, now Patent No. 1,889,614, dated November 29, 1932, and entitled "Sound wave apparatus".

One of the objects of my present invention is to provide certain improvements in apparatus of the type indicated whereby its utility on moving craft is greatly increased.

A further object of my invention is to provide sound echo apparatus more particularly for use in air media and which is of a highly directive type whereby a beam of air waves may be sharply directed upon a distant object from the craft upon which the apparatus is mounted and the reflected waves received in a similarly directive receiver whereby the direction, and distance, of the object from the craft may be accurately determined. A further object of my invention is to provide a highly directive sound echo apparatus and one which in addition to its directivity has the advantage that it is of such small dimensions and weight that it may readily be mounted upon upon a vessel either for temporary or permanent use and without objectionable encumberment of the craft.

Still a further object of my invention is to provide an acoustic echo apparatus in which a sustained tone, or air wave, is employed as the means whereby indications are obtained, said tone having a pitch materially higher than the principal sounds produced about the craft including that due to wind blowing into the equipment itself, whereby in accordance with my invention, said sustained tone may be efficiently selected from the extraneous sounds produced about the craft and supplied to a suitable indicating device. A further object of my invention is to provide such a system employing tones which are inaudible to the ear.

In my above mentioned copending application I have shown sound echo apparatus particularly adapted for use on aircraft to determine altitude from the earth, to determine the proximity of rising cliffs, or other sound reflecting surfaces forward of the craft and to indicate the angle of climb or bank of the craft. I have found that similar apparatus is well adapted to use on water craft as well and that when so employed possesses many advantages not previously obtained.

The novel features which I believe to be characteristic of my invention are set forth with particularity in the appended claims. My invention itself, however, both as to its organization and method of operation together with further objects and advantages thereof, may best be understood by reference to the following description taken in connection with the accompanying drawings, in which Fig. 1 indicates a vessel upon which the equipment in accordance with my invention is mounted. Fig. 2 shows the equipment in detail. Fig. 3 shows a modification thereof. Fig. 4 shows the equipment arranged on a vessel for remote control. Fig. 5 conventionally shows the equipment when used as shown in Fig. 4. Fig. 6 shows a further modification; and Figs. 7 and 8 indicate details thereof.

Referring to the drawings, I have shown in Fig. 1 a water craft 1 having mounted thereon the acoustic equipment provided in accordance with my invention, this equipment comprising a sound wave transmitter 2 and a sound wave receiver 3 mounted on a common support 4 above the cabin of the craft. The transmitter 2 is arranged to be supplied with air, or other suitable fluid under pressure through a conduit 5 under control of the mechanism 6 whereby it is caused to transmit either continuous sound waves or sound wave impulses, as desired. At the right of the Figure I have shown an object 7, which is indicated as another water craft which it is desired to locate from the craft 1 by means presently to be described.

The equipment constructed in accordance with my invention is shown in greater detail in Fig. 2 in which the transmitter 2 is shown as mounted upon a support 8 which is mounted for rotation about the axis of the shaft 9 to which it is rigidly secured. The shaft 9 has a handle 10 attached to the lower portion thereof whereby it, together with the support 8 and transmitter 2, may be rotated and oriented as desired during operation of the equipment. Also, mounted on the support 8 is a listening device 3 which preferably comprises a pair of megaphones 11 and 12 which are oriented in the same direction as the transmitter 2. These receiving devices are arranged upon the support 8 and receive sound waves from the transmitter 2, both directly and after reflection from a distant object. Each of these megaphones is connected respectively to one of the ear pieces of a stethoscope 13 through an acoustic channel comprising an acoustic filter 14 and suitable conduits 15. As a matter of convenience in mounting the equipment the conduits 15 may be carried downward through the shaft 9 to the stethoscope of the receiving device.

Both the transmitter and receiving megaphones are of similar shape and size, the transmitter 2 having arranged within it near its vertex portion a suitable whistle 16.

While other suitable means, such as a siren, for example, may be employed for generating the sound waves a whistle of any suitable construction is preferable for the production of sound waves of high intensity. The supply conduit 5 leading to the whistle is rigidly supported by means of a member 18 and terminates at its right end in a vertically arranged stuffing and bearing box 20, this box being arranged in alinement with the axis of the shaft 9. The whistle 16 is supplied from this stuffing box through the elbow member 21, the left-hand portion of the elbow member being arranged for rotation within the box 20 whereby this box serves as a bearing to support the equipment for rotation and at the same time prevents the escape of fluid for operating the whistle. The conduit 5 also includes a valve 22 whereby the supply of fluid to the whistle 16 is controlled.

Two different mechanisms are disclosed for operating the valve 22, one of these mechanisms comprising a lever 23 which is pivoted at a point 24, the left-hand end of the lever being arranged to engage the control member of the valve and the right-hand end of the lever being attached to a suitable cable 25 which extends downward through the shaft 9 and has a suitable handle 26 attached to the lower end thereof within easy access of the operator. This means for controlling the valve is employed when it is desired to transmit continuous sound waves although, of course, it may be utilized for transmitting short impulses of sound waves, a short jerk of the handle 26 being sufficient for this purpose.

When it is desired more continuously to transmit sound wave impulses, however, it is preferable that an automatic impulsing means be provided. This means I have shown at 6 and comprises a motor 27 having an armature which is directly connected across a pair of power supply conductors 28 through a variable resistance 29 and a switch 41. The motor also has a field winding 30 which is directly connected across the power supply conductors through the switch 41. The motor 27 is arranged to rotate a worm 31 and worm gear 32, the latter being mounted on a shaft 33 carrying two cams 34 and 35. These cams are arranged respectively to control two levers 36 and 37, the latter cam being substantially circular in form but having a notch 35' cut from one portion of its circumference and the former being of progressively increasing radii starting from a point about opposite the notch 35'. The lever 37 is pivoted at a point 38 and has a right-hand portion which engages the left-hand portion of the lever 23 and which therefore operates the valve. This lever also carries a roller 37' which rides upon the cam 35, thereby to support the left-hand portion of the lever. The lever 36 is pivoted about a point 39 below the point 38 and is provided with a roller 36' which rides against the periphery of the cam 34. A spring 40 is connected between the left-hand ends of the levers 36 and 37 and serves to draw these two levers together and to cause the respective rollers 36' and 37' carried thereby to bear upon the respective cams 34 and 35.

In the operation of this equipment the cams are rotated by the motor in a counter-clockwise direction. After a slight movement from the position shown in the drawing the roller 37' drops into the notch 35' allowing the lever 37 to be rocked in a counter-clockwise direction about its pivot and the valve 22 to be opened. Upon a slight further rotation of the cam 35 the roller 36' drops from a point on the periphery of cam 34 having large radius to a point having relatively small radius thereby releasing the tension on the spring 40. Upon a slight further rotation the lever 37 is again raised by the cam 35' thereby causing the valve 22 to again close after the sound wave impulse has been transmitted. The cam 34 now gradually tensions the spring 40 until a point in the rotation of the cams is reached at which the next impulse is transmitted.

In this way the valve 22 is positively opened and closed to supply a short blast of gas to the whistle 16 upon each rotation of the cams. The mechanism described is peculiarly adapted for this purpose due to the fact that the energy necessary for operation of the valve is first stored in the spring 40 and is then suddenly released to cause actuation of the valve. This has the advantage that the motor 27 may be of small size and weight since the storage of energy in the spring 40 takes place at a comparatively slow rate. The system avoids the use of such energy storage devices as a fly-wheel, for example, or other equipment of heavy weight, which would undesirably encumber the apparatus and prevent its convenient use upon moving craft, particularly upon air craft.

It will thus be seen that by energizing the motor, as by closing the switch 41, the valve 22 is periodically actuated by the mechanism 6, thereby causing a succession of sound wave impulses to be transmitted by the transmitter 2. These sound wave impulses are of course heard in the stethoscope 13, both when transmitted and after being reflected from a distant object.

As thus arranged, the equipment is adapted for two distinct methods of operation. If the operator is merely interested in ascertaining the direction of a distant object, together with a rough indication of the distance of the object from the craft, and when it is desirable only to be warned as to the approach of other craft, then the switch 41 may be opened and the transmitter controlled by means of the handle 26. The pilot will grasp the handles 10 and 26. By operating the handle 26 downward, air or steam, as the case may be, is supplied to the whistle 16 and a continuous stream of sound waves is sent out. By rotating the handle 10, the equipment, including the transmitter and receiver, is rotated with respect to the craft, thereby scanning the horizon about the craft with a beam of sound waves. If there be no distant object within the area scanned the sound waves received in the stethoscope will be of about equal intensity throughout the rotation of the equipment. If, however, the sound waves fall upon a distant object, such as a boat which has entered the area scanned, then the intensity of the sound waves will be increased as the equipment passes through the position in which it is oriented toward the distant object. Of course, the extent of the increase in intensity of the received waves offers some indication as to the distance between the craft and the distant object, but a more satisfactory indication is had by releasing the handle 26 thereby interrupting the stream of sound waves, and thereafter giving the handle a short jerk and observing the time interval elapsing between the transmitted impulses and the received echo. If desired, the switch 41 may be closed, thereby setting the impulse mechanism 6 into operation. The beam of sound waves now becomes a beam of sound wave impulses. The distance of the craft from the object producing the echo may then be accurately determined. By maintaining the equipment oriented upon a distant craft by means of the handle 10 and by observing the position of the handle 10 where the maximum echo is received and also by observing the interval between the transmitted and received impulses, the movements of the distant object may be accurately followed.

To facilitate the determination of the time interval between the transmitted and received impulses a timing mechanism 42 is provided. This mechanism comprises an index 43 which is normally held in a predetermined fixed position by means of a magnet 44, but which when released is operated by means of a clock motor, or other suitable mechanism, over a dial 45. The magnet 44 is connected in circuit with a pair of contacts 46 which are bridged by the member 47 attached to the left-hand end of the lever 37 whereby the magnet 44 is energized upon the transmission of each sound wave impulse. When so energized the index 43 rotates over the dial. The operator then observes the position of the index 43 when the echo is received and thereby determines the distance from the craft to the distant object.

In cases, as shown in Fig. 1 for example, where the operator is unable to see the equipment, it is desirable that some suitable means be provided whereby he is informed as to the direction in which the equipment is oriented. Such an indication is conveniently given by means of a dial 42' arranged upon the shaft 9 having an index pointing in the direction in which the equipment is oriented.

During movement of the craft, and particularly when the craft is travelling at high speed, it is desirable that the impulse mechanism 6 be continuously in operation in order that the pilot while scanning the horizon by rotation of the handle 10 shall be immediately informed as to the distance of any object coming within the area scanned by the beam of sound wave impulses. If desired, means, not shown, may readily be provided to lock the equipment in such a position that it throws the sound wave beam forward and directly along the path of travel of the craft whereby an immediate indication is produced of any object coming within this path of travel.

By means of the variable resistance 29 connected in circuit with the motor armature the speed of the motor 27 is controlled and thereby the interval between successive impulses and also the duration of each impulse is determined. The most advantageous interval of the transmitted impulses varies with the frequency of the sound waves employed but should be of such duration that the individual impulses have the character of a sustained musical tone, as distinct from an explosive impulse as produced by a gun, for example. In this way the received reflected sound waves are more readily distinguishable from sounds produced about the craft. Each impulse should have a duration of 30 or more cycles of the transmitted wave. I have found that an interval of five seconds between impulses is satisfactory.

It is of especial importance in the operation of my invention that the sound or air wave employed be of a high frequency. While, as will later be explained, inaudible frequencies may be employed, I contemplate where particular conditions do not call for the use of inaudible frequencies the employment of frequencies of about 3000 cycles, or frequencies within the range extending from 2000 to 4000 cycles per second. By using these high frequencies the transmitting and receiving megaphones may be of large dimensions relative to the wave length. Thus, for example, the diameter at the base of these megaphones is preferably two or three times the wave length of the sound waves employed and the length of the megaphones is two to three times their base diameter. As thus constructed the transmitter and receiver are very highly directive, thereby concentrating all of the sound wave energy generated by the whistle 16 in a narrow beam projecting from the transmitter 2. Were this not the case, the utility of the device would be very greatly impaired by reason of the fact that accurate determination of the direction from which the echo is received would be impossible. This characteristic of the equipment would be especially objectionable when the equipment is used on water craft near shore or in harbors where the echoes from the shore line offer a maximum interference to the determination of the direction of an object in the water about the craft. When using the high frequencies mentioned, the extreme directivity which is desired can be obtained without using megaphones of objectionable size and such as would objectionably encumber the craft.

The receiving megaphones should be so positioned with respect to the transmitter that the impulses received directly are of greater intensity than any echo which is received. In this way a natural impression of echo is produced upon the ear of the operator. At the same time the sound received directly should not be of such intensity as to deafen the ear of the operator to the less intense echo waves. When using highly directive transmitting and receiving megaphones this result can be attained even though the receiving megaphones are mounted very close to the transmitter as upon the same support as shown in Fig. 2 thereby greatly facilitating the handling of the equipment. The receiving megaphones may, of course, be mounted at a distance from the transmitter where desired, but when the sound waves received directly are of insufficient intensity to avoid confusion with the echo a composite path should be provided to guide sound waves from the transmitter to the receiver. Such a path is shown and described in my copending application, Serial No. 532,006, filed April 22, 1931, and entitled "Sound wave apparatus".

A further advantage in using high frequencies results from the fact that the echo from which the useful indication is derived is produced largely by scattering of sound from the reflecting surface. This scattering of sound increases with the 4th power of the frequency. Thus, when utilizing a frequency of 3000 cycles, for example, the scattered sound wave energy obtained is about 10000 times greater than the scattered sound wave energy that would be obtained when using a frequency of 300 cycles. For this reason the echo intensity is very greatly increased by using frequencies of the order mentioned.

A further advantage resulting from the use of high frequencies resides in the ability to discriminate, in the receiver, between extraneous sound waves produced about the craft, as for example, the sound waves produced by wind blowing in the receiving megaphones, and the high frequency sound waves produced by the whistle 16. This discrimination is effected by means of the acoustic filters 14 arranged in each of the receiving channels between the receivers 11 and 12 and the stethoscope. These filters may be of a form shown in United States Patent No. 1,692,317, issued November 20, 1928, to G. W. Stewart. They comprise a small pipe of about ⅜" diameter having disposed along the length thereof a number of openings 46', these openings being small bores in the wall of the pipe whereby a plurality of shunt connected air passages are formed, causing the filter to offer a low shunt impedance to sound waves having the frequencies of the principal sounds produced about the craft, such for example as sounds having a frequency between 100 and 300 cycles per second and at the same time, to offer high shunt impedance to waves having a frequency of air waves produced by the whistle 16. The filters are preferably enclosed within suitably damped housings 47', these housings being lined with felt and divided into compartments by means of felt partitions 48, each compartment being arranged to receive the sound through one of the openings 46'. The interior of the housing may be vented as indicated at 49 to permit the escape of air which enters the housing through the openings 46'. The compartments between the partitions 48 are filled with suitable damping material such as cotton waste, the whole body comprising means whereby extraneous sounds produced about the craft, including wind noises, are prevented from entering the sound wave channel through the openings in the filter.

For maximum utility on water craft of equipment of the type described, however, it is desirable that the same receiving device which is employed in receiving waves from transmitter 2 after reflection from distant objects should be used to listen to the sound produced by channel buoys and by the whistles of other craft. Since the sound of these devices, as commonly employed, is in the neighborhood of 300 cycles it is desirable to provide means whereby these frequencies may also be transmitted through the filters 14. These low tones can, to a certain small extent, be heard even though the filters 14 are included in the system, first, for the reason that these filters are not perfect in their suppression of the fundamental frequencies of these tones, and second, for the reason that certain harmonics of these fundamental tones pass through the filter and impinge upon the ear of the operator, thereby enabling the ear, as is well known, to produce the impression of the fundamental. It is far more satisfactory, however, to provide means whereby the filters may be effectively removed from the sound wave channel, or to permit such adjustment of the filters that best operation may be had at the particular frequency which it is desired to receive.

Means whereby this adjustment is effected are shown in Fig. 3. In this figure the two filters 14 are each provided with a tubing 50 arranged about the filter and concentric therewith, this tubing having openings therein in alinement with the openings in the filter. The tubings 50 are each secured to a respective gear 51 which gears cooperate with an additional gear 52. The gear 52 is mounted upon a shaft 53 extending through the shaft 9 and which has mounted thereon a handle 54, whereby it may be rotated. By rotating the handle 54, the gears 52 and 51 are rotated, thereby rotating the tubings 50 with respect to the filters and to such a position that the openings in the filters are closed. In this way the filters are effectively removed from the sound wave channel. If desired, however, the tubing 50 may be so adjusted that the openings are only partially closed whereby the cut-off point of the filter is varied in such a way that most satisfactory operation is had at the particular frequency which it is desired to receive. After some small experience the operator will of course become familiar with the best adjustment of the filter and will adjust the handle 54 accordingly whenever waves of the particular frequency are to be received.

When utilizing the equipment upon large craft, such as sea-going vessels for example, it is desirable that it be mounted at the extreme foremost position of the craft whereby the receiving devices pick up a minimum of sound produced about the craft and structures on the fore portion of the craft are prevented from producing echoes in the equipment. This arrangement of the equipment is shown at 2, 3, in Fig. 4. Of course, it is desirable, with the equipment so located, to provide some form of remote control means whereby the scanning may be effected from the point at which observations are made, as from the bridge or pilot house. Such a remote control arrangement is conveniently indicated in Fig. 5 in which the shaft 9 is connected to the armature of an inductance device 55, having stator windings which are connected to the stator windings of a second inductance device 55' which is located at the point at which the observations are to be made. The armature windings are connected in parallel and to a suitable source of alternating current, as indicated at 56. By rotation of the armature of inductance device 55' by means of the handle 57 the armature of inductance device 55 is caused to rotate and thereby correspondingly orients the transmitter 2 and receiver 3. If adjustable filters are employed as shown in Fig. 3 their adjustment can of course be remotely effected by similar means.

The sound waves received in the megaphones 11 and 12 and which traverse the filters 14 may, if desired, be electrically transmitted to the point where observations are to be made. Means whereby these sound waves are converted into electrical waves are of course well known. Suitable microphones or magneto-phones, as shown in my second above mentioned copending application, Serial No. 532,006, may be employed, as indicated at 58. The output from these pick-up devices may be amplified by electron discharge amplifiers conventionally indicated at 59 and supplied to the respective ear pieces of a pair of headphones 60. The timing device 43, 45 may be located at the point where observations are made and controlled by conductors extending through a conduit 61 through which the apparatus 6 is also controlled.

When the equipment is used, for example, in areas of congested traffic, the use of sound waves of audible frequency may be objectionable, and in such cases it is desirable to utilize frequencies which are inaudible. Such an arrangement is shown in Fig. 6. The receiving equipment is similar to that shown in Fig. 5 although preferably a different type of device is employed for converting the air waves into electrical waves and additional means are shown whereby an audible indication is produced in response to the inaudible sound waves.

To convert the received air waves into electric waves I particularly contemplate the use of piezo electric crystals of any suitable type. The crystals may be suitably arranged in housings 62 attached to the end of the filters 14 and subjected to the air waves received through the filter in any desired way. Electromotive forces produced by the crystals may then be impressed upon the input circuits 63 of a pair of amplifier detectors 64. The input circuits 63 are also each coupled to the output from an oscillation generator 65 through coupling devices 66. The oscillation generator may be arranged to produce oscillations of inaudible frequency but which differs from the frequency of the received sound waves by an amount within the audible range. The currents having this audible difference frequency are then produced in the output circuit of detectors 64 and supplied to the respective ear pieces of the head set 67.

While it will be understood that many different arrangements for subjecting a piezo electric crystal to the received air waves thereby to produce electric waves of the same frequency may be employed, I have shown in Fig. 7 one arrangement whereby this result is effected. In this figure I have shown the filter 14 as opening into a small chamber 68 the lower wall of which is formed by a diaphragm 69. This diaphragm may bear directly upon the crystal but preferably it has secured to its lower surface a small piece of light material 70, such as a piece of a suitable phenolic condensation product, thereby to impart a certain amount of stiffness to the central portion of the diaphragm. This piece of material, however, is smaller than the diaphragm and accordingly that portion of the diaphragm extending beyond the member 70 is flexible and readily yields to the pressure of air waves received through the filter. This member has the effect of preventing buckling of the diaphragm and increasing its effective area. Below the member 70 is arranged a stack of piezo electric crystals 71, the crystals being arranged in edgewise relation in the stack. The lower crystal is supported by a heavy base member 72 and the upper crystal supports the member 70 with a slight amount of pressure. The other walls 73 of the housing 62 surrounding the crystals may be of any suitable material and preferably completely enclose the crystals. The stack of crystals may comprise any desired number of crystals, and may comprise a single crystal, but is of such dimensions that the stack has a natural frequency equal to the frequency of sound waves employed. The electromotive forces generated by the different crystals of the stack may be utilized either in parallel or in series but with the connections shown in the drawings they are utilized in series. The two crystals 71 comprising the stack shown in the drawings have a common electrode 74 arranged on one of their broadside faces and separate electrodes 75 and 76 arranged on the opposite broadside faces. In this way any pressure exerted upon the crystals by the diaphragm 68 causes each crystal to produce a certain electromotive force between its opposite broadside faces. By properly polarizing the crystals these electromotive forces may be caused to aid each other thereby producing a greater electromotive force between electrodes 75 and 76 than would be the case were but a single crystal employed. This electromotive force may be supplied to the circuits 63 of Fig. 6.

While different types of piezo electric crystals may be employed I contemplate the use of crystals of the Rochelle salt type cut from the mother crystal in the manner taught by my United States Patent No. 1,717,263, issued June 11, 1929.

The use of Rochelle salt crystals as described is particularly advantageous in that while these devices are selective to sound waves having the natural frequency of the crystal stack, they are also aperiodically responsive to compressional waves of low frequency, which may, for example, be the frequencies of foghorns, channel buoys, or the whistles of other craft. Thus the device may also be utilized to listen to these devices. When receiving waves from these devices, the operation of the oscillator 65 may be interrupted as by means of the switch 65', in which case the device 62 operates to amplify the audible frequencies produced by the piezo electric crystal and to supply these frequencies to the headphones 67. The filters may of course be utilized as explained in connection with Figs. 2 and 3.

It is of course desirable in utilizing air vibrations of inaudible frequency to provide means whereby these vibrations are of high intensity, thereby to give the device a maximum range of utility. In Fig. 8 I have shown a whistle of a form suitable for producing these inaudible air vibrations of high power. This whistle comprises a short tube 77, one end of which comprises a sharp circumferential edge 78. A blast of air, or other gas, is blown upon the edge 78 from an opening 79 in a mouthpiece 80 of the whistle. The tube 77 is closed at a point distant from the opening 79 by means of a plug 81, thereby producing a hollow chamber in the end of the tube 77 having a length approximately equal to one-quarter of a wave length of the sound waves produced.

During practical tests of my invention, arranged more particularly as shown in Fig. 2 and utilizing a frequency of three thousand cycles, I have found that even very small objects may be accurately located at considerable distances. These tests have been made both on land and water. For example, in an open level field I have found that an object of the size of a small sedan automobile could be accurately located at a distance of approximately 1000 feet and a small aircraft hanger could be located at about twice that distance. On water I have found that the average distance of a typical shore line can readily be determined at distances in excess of half of a mile. Further, very satisfactory echoes have been received from small objects such as a row boat with three people in it, a spar buoy one foot in diameter and fifteen feet long and a "nun" or "can" buoy two feet in diameter and four feet high, the row boat being at a distance of 800 feet, the "nun" or "can" buoy being at maximum distances of from 270 to 540 feet and the spar buoys being at maximum distances of from 270 to 810 feet dependent upon the position of the buoy in the water. These results were obtained in various weather conditions with the wind varying from ten to twenty miles per hour, and with the equipment mounted on a vessel travelling at the rate of twelve miles per hour. The condition of wind and sea appear to have little effect upon the range from which satisfactory echoes may be had although a faint out-rushing sound may be heard in the stethoscope in rough weather which is probably due to the scattering of the out-going whistle sound by the wind and waves. No echo appears to be produced by white caps.

In each of the figures of the drawings I have shown two receiving megaphones. Very satisfactory results, however, may be obtained by the use of a single receiving megaphone. Some advantage is gained, however, in the use of two megaphones since it permits of the use of the binaural sense of the operator in locating distant sound sources such as fog horns and buoys. It is also of advantage in scanning by use of the sound beam since the operator then receives a sense of sound alternately increasing and decreasing in his two ear pieces as the apparatus is rotated through the position in which it is directed toward a distant sound reflecting object.

While I have shown particular embodiments of my invention it will of course be understood that I do not wish to be limited thereto since many modifications may be made both in the structural arrangement and the instrumentalities employed and I contemplate by the appended claims to cover any such modifications as fall within the true spirit and scope of my invention.

What I claim as new and desire to secure by Letters Patent of the United States, is:

1. The combination, in a system for detecting the presence of distant objects from moving craft, of a directional air wave transmitter, a directional air wave receiver, said transmitter being arranged to transmit a beam of air wave impulses of high intensity and said receiver being arranged to receive said air wave impulses from said transmitter after reflection from a distant object, means for rotating said air wave transmitter and receiver in unison with respect to the craft whereby an area about the craft may be scanned with said beam of air wave impulses and the presence of a distant object in said area may be detected by air waves received in said receiver after reflection from said object, and means to determine the time interval elapsing between the transmission of a sound wave impulse and reception thereof in said receiver whereby the distance of said object from the craft may be determined.

2. The combination, in a navigating system for moving craft, a transmitter of a continuous beam of sound waves, a binaural receiver of sound wave impulses, said receiver being arranged to receive sound waves from said transmitter both directly and after reflection from a distant object, and means for rotating said transmitter and receiver in unison with respect to the craft whereby an area about the craft is scanned with a continuous beam of sound waves and the lateral position of an object in said area is detected by sound waves received in said receiver after reflection from said object, and the distance between said transmitter and object is determined by the time interval between reception of a sound wave impulse in said receiver directly from said transmitter and reception of said impulse in said receiver after reflection from said object.

3. The combination, in a system for detecting the presence of distant objects, a directive air wave transmitter, a directive air wave receiver, said receiver being arranged to receive air waves from said transmitter after reflection from a distant object, said transmitter and receiver having length and base dimensions long as compared with the wave length of the air waves emitted by said transmitter, a common support for both said transmitter and receiver, and means for rotating said support whereby an area about said system may be scanned by a beam of air waves transmitted by said transmitter and the position of an object in said area may be detected by air waves received in said receiver after reflection from said object.

4. In a sound wave apparatus for locating distant objects from moving craft, a directive sound wave transmitter, means to cause said transmitter selectively to transmit a beam of continuous sound waves and sound wave impulses, a sound wave receiver responsive to said sound waves received from said transmitter both directly and after reflection from a distant object, and means to rotate said transmitter and receiver in unison with respect to the craft thereby to scan an area about the craft with a beam of sound waves whereby the lateral location of a distant object may be detected by the change in intensity of continuous sound waves received in said receiver when said transmitter and receiver are directed toward a distant object and the distance of said object from the craft may be determined by the interval between the transmission of a sound impulse and its reception in said receiver after reflection from said object.

5. The combination, in a sound wave echo apparatus, a transmitting megaphone, a receiving megaphone, both said transmitting megaphone and said receiving megaphone being directed in the same direction, a whistle in said transmitting megaphone arranged to produce air waves of inaudible frequency, means to supply gas under pressure for operation of said whistle whereby a beam of inaudible air waves is transmitted from said transmitting megaphone and is received in said receiving megaphone after reflection from a distant surface, and means selectively responsive to inaudible air waves produced by said whistle to produce an audible indication at said receiver.

6. The combination, in an air wave echo apparatus, of means to produce air waves of high intensity and inaudible frequency, means to direct said waves toward a distant surface, a receiver arranged to respond to said air waves after reflection from said surface, means to render said receiver selective to air waves of said audible frequency, and means for indicating the reception of said waves.

7. In combination, a sound wave receiver, a rotatable support therefor, a sound wave indicating device, a channel including a filter connected between said sound wave receiver and indicating device, said filter being arranged on said support, rotatable means carried by the support for adjusting the frequency response characteristic of said filter, and means rotatable about the axis of rotation of said support for controlling said adjusting means.

8. In combination, a plurality of sound wave receivers, a rotatable support for said receivers, a sound wave indicating device, connections between said sound wave indicating device and each of said receivers, a plurality of filters arranged on said rotatable support, each filter being included in one of said connections, means to adjust the frequency response characteristic of each of said filters, a shaft rotatable about the axis of said support, and means to control said adjusting means in accordance with the position in rotation of said shaft, whereby the frequency response characteristics of all of said filters are controlled by rotation of said shaft.

9. In combination, a sound wave transmitter, a sound wave receiver, a sound wave indicating device, a rotatable support for said sound wave transmitter and receiver whereby said transmitter and receiver may be rotated in unison, a sound wave filter arranged on said support, and a sound wave channel between said sound wave receiver and indicating device including said filter, means for adjusting the frequency response characteristic of said filter, and means rotatable about the axis of said support for controlling said adjusting means.

10. In combination, a sound wave receiver, a rotatable support therefor, a sound wave indicating device, an acoustic channel between said sound wave receiver and said sound wave indicating device, an acoustic filter included in said channel, said acoustic filter being carried by said support and comprising concentric relatively rotatable tubings having apertures therein arranged for alignment, one of said tubings having a gear rigidly attached thereto, a shaft arranged to rotate about the axis of rotation of said support and a gear rigidly connected thereto, said gears being arranged for engagement whereby upon rotation of said shaft said apertures in said tubings are moved to and from alignment thereby to alter the frequency response characteristic of said filter.

11. The method of locating distant objects from moving craft, which comprises scanning the area about said craft with a directional beam of continuous sound waves, receiving said waves both through reflection from a distant object to be located and independently of such reflecting, noting the change in intensity of sound waves received during said scanning to determine the direction of the distant object to be located and thereafter locating said object by transmitting a beam of sound wave impulses in the direction of said object and noting the duration of the time interval between the transmission of an impulse and reception thereof after reflection from the distant object.

CHESTER W. RICE.